United States Patent [19]

Harada et al.

[11] Patent Number: 4,626,983
[45] Date of Patent: Dec. 2, 1986

[54] POWER CONVERSION DEVICE FOR SOLAR CELL

[75] Inventors: Kosuke Harada, Fukuoka; Katsuaki Murata, Kumamoto; Takazi Nakamizo, Fukuoka, all of Japan

[73] Assignee: Nishimu Electronics Industries Co., Ltd., Fukuoka, Japan

[21] Appl. No.: 654,858

[22] Filed: Sep. 26, 1984

[30] Foreign Application Priority Data

Oct. 6, 1983 [JP] Japan .................................. 58-186011

[51] Int. Cl.⁴ .......................................... H02M 7/515
[52] U.S. Cl. ..................................... 363/132; 363/98; 363/133; 323/906; 136/293
[58] Field of Search .................. 323/299, 300, 906; 363/95-98, 131-134, 135-136, 139, 41; 136/293

[56] References Cited

U.S. PATENT DOCUMENTS 4,375,662  3/1983  Baker ............................... 323/299 X
4,404,472  9/1983  Steigerwald .................... 323/906 X

OTHER PUBLICATIONS

C. Franx, "A New Approach to Solar Pump Systems Using Submersible Motors", Photovoltaic Solar Energy Conference, Berlin, W. Germany, Apr. 23-26, 1979, pp. 1038-1046.

Roesler, "A 60kW Solar Cell Power System with Peak Power Tracking and Utility Interface", 13th IEEE Photovoltaic Specialists Conference, Washington, D.C., (Jun. 5-8, 1978), pp. 978-983.

Primary Examiner—Peter S. Wong
Attorney, Agent, or Firm—Kinney & Lange

[57] ABSTRACT

A power conversion device of simple configuration for a solar cell which permits the solar cell to be connected to the commercial power source and enables the maximum electric power corresponding to the amount of incident sunlight to be drawn from the solar cell.

A power conversion device for a solar cell of this invention comprises a voltage controlled oscillator capable of generating oscillation with a frequency which is the function of the dc output voltage of said solar cell, an inverter controlled based on the output frequency of said voltage controlled oscillator to receive the dc output current of said solar cell and convert said dc output current into an alternating current, and an inductor serving to connect the ac output from said inverter to a commercial power source.

6 Claims, 7 Drawing Figures

POWER CONVERSION DEVICE FOR SOLAR CELL

BACKGROUND OF THE INVENTION

1. Field of the Invention

This invention relates to a power conversion device for a solar cell. More particularly, this invention relates to a power conversion device for a solar cell which can draw from the solar cell the maximum electric power corresponding to the amount of sunlight impinging upon the solar cell and can establish interconnection between the solar cell and a commercial ac power source.

2. Description of the Prior Art

Solar cells, as widely known, are designed to absorb sunlight and generate electric current. The generated electric current or electric power, therefore, varies with the varying amount of sunlight impinging upon the solar cell. During the night, no electric power can be drawn from the solar cell.

In the solar cell power source systems which have been reduced to practical utility, therefore, it is customary that they are combined with secondary batteries to form so-called floating charging circuits. In this construction, since the secondary batteries are charged during the daytime generally abundant with sunlight, necessary electric power can be drawn from them even during the night or on rainy or cloudy days deficient in sunlight.

In the conventional system, when the lead battery which has found popular use is adopted as the secondary battery, it not merely entails the danger due to the generation of hydrogen gas and oxygen gas but also necessitates maintenance such as replenishment of electrolyte. The lead battery, therefore, has a disadvantage that it cannot be utilized in such a small power system as owned by any household power consumer.

Storage batteries of other types are expensive and possess no ample capacity.

Further, since the commercial power source (100/200 V, 50/60 cycles) is widely used for various kinds of devices or equipments, the solar cell system is desired to be capable of connection to the commercial power source.

This interconnection, however, proves disadvantageous in respect that it necessitates additional incorporation of an inverter, for example, and inevitably complicates the mechanism, increases the size, and adds to the cost of equipment.

SUMMARY OF THE INVENTION

This invention has been produced with a view to eliminating the drawbacks mentioned above. An object of this invention, therefore, is to provide a power conversion device of simple configuration for a solar cell which permits the solar cell to be connected to the commercial power source and enables the maximum electric power corresponding to the amount of incident sunlight to be drawn from the solar cell.

DETAILED DESCRIPTION OF PREFERRED EMBODIMENTS

Now, this invention will be described in detail below with reference to the accompanying drawings.

Figure 1:
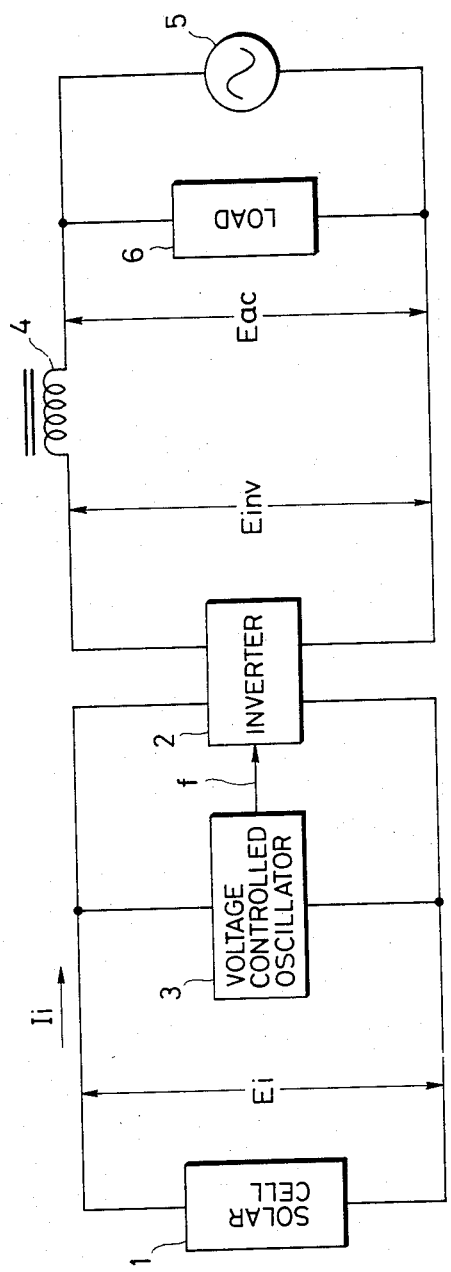
FIG. 1 is a block diagram illustrating one embodiment of the present invention.

FIG. 1 is a block diagram of one embodiment of this invention.

A solar cell 1 supplies electric power corresponding to the amount of incident sunlight to an inverter 2. A voltage controlled oscillator (VCO) 3 oscillates with a frequency f corresponding to the output voltage Ei of the solar cell 1. The aforementioned inverter 2 operates with the aforementioned frequency f and converts the direct current from the solar cell 1 into an alternating current. The aforementioned frequency f of the oscillation increases in proportion as the magnitude of the output voltage Ei increases.

The output (ac) side of the inverter 2 is connected via an inductor 4 to a commercial ac power source 5. A load 6 is connected to the output side of the inverter 2 or to the commercial ac power source 5.

During the operation of the solar cell 1, the current Ii generated by the solar cell 1 is supplied to the inverter 2 and the voltage controlled oscillator 3. At this time, the terminal voltage of the solar cell 1 is Ei. At the same time, the voltage controlled oscillator 3 generates oscillation with the frequency f and, as the result, the inverter 2 generates an alternating current voltage Einv with the aforementioned frequency f. Here, Einv denotes the effective value of fundamental frequency component.

Let Eac stand for the effective value of voltage of the commercial power source 5 and L stand for the inductance of the inductor 4, and the voltage p supplied from the inverter 2 via the inductor 4 to the commercial power source 5 or vice versa will be expressed, as widely known, by the following formula (1).

$$P = \frac{Einv \cdot Eac}{2\pi fL} \sin \theta \qquad (1)$$

wherein $\theta$ denotes a phase angle between the waveform of the ac voltage Einv issuing from the inverter 2 and the ac waveform Eac of the commercial power source 5.

If the phase of the ac voltage Einv of the inverter 2 is in advance of that of the ac waveform Eac of the commercial power source 5, the power flows from the inverter 2 side via the inductor 4 to the commercial power source 5 side, effecting power supply from the solar cell 1 to the load 6.

In the present invention, the output frequency of the inverter 2 is automatically synchronized with the frequency of the commercial power source 5. Now, the principle underlying this automatic synchronization will be described below.

It is assumed that by the output Ei of the solar cell 1, the voltage controlled oscillator 3 is caused to generate oscillation with the frequency f and the inverter 2 to generate the ac voltage Einv with the fundamental frequency f. It is further assumed that the phase of the output ac voltage Einv of the inverter 2 is in advance of that of the commercial power source 5 and, as the result, the power is flowing from the solar cell 1 side via the inductor 4 to the commercial power source side 5.

In the condition mentioned above, when the amount of incident sunlight reaching the solar cell 1 increases and, consequently, the output voltage Ei therefrom proportionally increases, the oscillation frequency f of the voltage controlled oscillator 3 tends to increase proportionally. As the result, the frequency of the output ac of the inverter 2 tends to increase and the phase of the output ac voltage thereof tends to advance, namely the advanced phase angle of the output ac voltage Einv of the inverter 2 relative to the voltage Eac of the commercial power source 5 tends to increase.

As clearly noted from the aforementioned formula (1), the power supplied from the solar cell 1 via the inductor 4 to the commercial power source 5 increases.

Consequently, the current flowing from the solar cell 1 to the inverter 2 is increased and the voltage drop due to the internal resistance of the solar cell 1 is increased effectively to lower the output voltage Ei of the solar cell 1. As the outcome of this development, an elevation of the output voltage Ei of the solar cell 1 and the growing ac frequency of the inverter 2 are effectively curbed.

Conversely when the amount of incident sunlight reaching the solar cell 1 decreases and, consequently, the output voltage Ei from the solar cell proportionally decreases, the oscillation frequency f of the voltage controlled oscillator 3 tends to decrease proportionally. As the result, the frequency of output ac from the inverter 2 tends to decrease and the phase of the output voltage tends to lag.

Consequently, the power supplied from the solar cell 1 to the commercial power source 5 decreases. The current flowing from the solar cell 1 to the inverter 2, therefore, is decreased.

The voltage drop due to the internal resistance of the solar cell 1 decreased effectively to increase the output voltage Ei of the solar cell 1. As the outcome of this development, a decrease of the output voltage Ei of the solar cell 1 and the falling ac frequency of the inverter 2 are effectively curbed.

Based on the principle described above, the frequency of the output ac voltage Einv of the inverter 2 is automatically retained at a fixed level and synchronized with the frequency of the commercial power source 5 in spite of variation in the amount of incident sunlight reaching the solar cell.

This statement also implies that the output voltage of the solar cell 1 is retained substantially at a fixed level. This fact brings about a desirable characteristic as described below.

Figure 2:
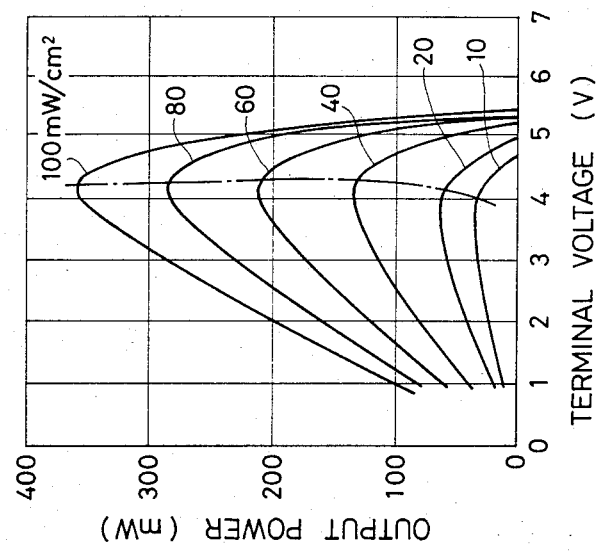
FIG. 2 is a graph showing the relation between the terminal voltage in V (horizontal axis) and the output power in mW (vertical axis) of the solar cell with the amount of incident sunlight (incident solar energy) in $mW/cm^2$ as the parameter.

FIG. 2 shows the relation between the terminal voltage in V (horizontal axis) and the output power in mW (vertical axis) of the solar cell 1, with the amount of incident sunlight or the solar energy in mW/cm$^2$ as the parameter. It is noted from this graph that the power which can be drawn from the solar cell 1 is naturally increased by the increase of the incident solar energy and is also varied by the terminal voltage.

For a fixed incident solar energy, the output power increases in proportion as the terminal voltage increases but the output power conversely decreases when the terminal voltage surpasses a certain value. In other words, there exists the optimum terminal voltage at which the output power is maximized. What is more, this optimum terminal voltage is substantially constant (in the neighborhood of 4 volts) as noted from FIG. 2.

In the embodiment of FIG. 1, therefore, the maximum power corresponding to the existing amount of incident sunlight can be drawn at all times from the solar cell 1 when the circuit constants of the various parts are selected so as to equalize the output voltage Ei of the solar cell 1 with the aforementioned optimum terminal voltage.

Figure 3:
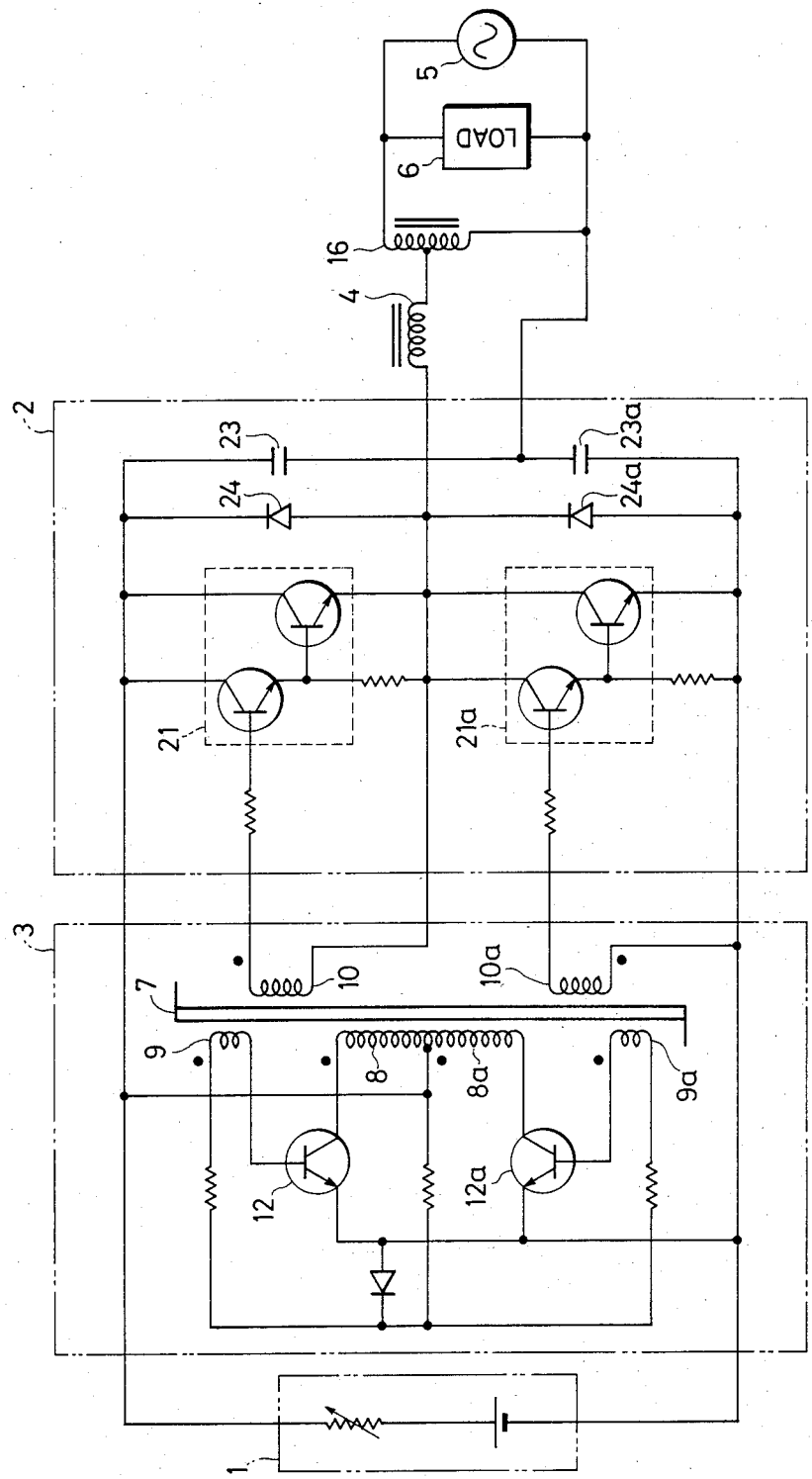
FIG. 3 is a diagram illustrating a typical circuit of another embodiment of this invention.

FIG. 3 is a diagram illustrating a typical circuit of another embodiment of the present invention. In this diagram, the same numerical symbols as those of FIG. 1 denote identical or equal component parts of the device.

On a saturable core 7, primary windings 8, 8a, secondary windings 9, 9a, and output windings 10, 10a are coiled. The leading terminals of the primary windings 8, 8a are joined mutually and connected to the positive terminal of the solar cell 1.

The remaining terminals are connected to the collectors of the corresponding transistors 12, 12a. The emitters of the aforementioned transistors 12, 12a are joined mutually and connected to the negative terminal of the solar cell 1.

The bases of the aforementioned transistors 12, 12a are respectively connected to the leading terminals of the secondary windings 9, 9a. The remaining terminals of the secondary windings 9, 9a are mutually joined through their respective resistors and connected through other resistor to the positive terminal of the solar cell 1.

As noted from the foregoing description, the primary windings 8, 8a, secondary windings 9, 9a, output windings 10, 10a, transformer 12, 12a, etc. described above make up a well-known Royer's oscillator circuit, which functions in this embodiment as a voltage controlled oscillator 3.

Capacitors 23, 23a are serially connected between the positive and negative terminals of the solar cell 1. Diodes 24, 24a are serially connected in a reversely polarized manner between the positive and negative terminals of the solar cell 1.

Transistors 21, 21a are each formed of a Darlington transistor and are connected in reverse parallelism to the aforementioned diodes 24, 24a.

The bases and emitters of the aforementioned transistors 21, 21a are respectively connected to the opposite terminals of the output windings 10, 10a. The node of the aforementioned diodes 24, 24a is connected via the inductor 4 to one of the input terminals of the output transformer 16.

The node of the aforementioned capacitors 23, 23a is connected to the other input terminal of the aforementioned output transformer 16 and one terminal of the commercial power source 5. The other terminal of the commercial power source 5 is connected to the output terminal of the output transformer 16.

The transistors 21, 21a, capacitors 23, 23a, and diodes 24, 24a mentioned above make up a half bridge inverter 2.

During the operation of the device, either of the transistors 12, 12a is turned on. On the assumption that the transistor 12 is turned on, a primary current flows through a circuit of solar cell 1→primary winding 8→transistor 12→solar cell 1, inducing a voltage in the second windings 9, 9a.

The voltage of the second winding 9 confers a forward bias upon the transistor 12 and the voltage of the second winding 9a confers a reverse bias upon the transistor 12a. As the result, there is generated a so-called positive feedback action, which induces abrupt saturation of the transistor 12.

Thus, the core 7 is excited by the current flowing through the primary winding. When the magnetic flux of the core is saturated in due course of time, the voltage of the secondary winding 9 is extinguished and the base current of the transistor 12 is lowered to 0, with the result that the transistor 12 is shut off.

The magnetic flux of the core begins to decrease. As the result, a voltage of reversed polarity is induced in the secondary windings 9, 9a and a forward bias is applied to the transistor 12a. Hence, a primary current flows through a circuit of solar cell 1→primary winding 8a→transistor 12a→solar cell 1.

By the same positive feedback action as described above, the transistor 12a is saturated in this time and the core 7 is excited so that the magnetic flux of the core 7 is saturated in the reverse direction.

Consequently, an alternating current (rectangular waveform) is generated in the output winding 10 because the two transistors 12, 12a are alternately turned on as described above.

Evidently, the transistors 21, 21a alternately assume the status of forward bias. In the meantime, the capacitors 23, 23a are charged by means of the solar cell 1. When the transistor 21 is turned on, therefore, the charge of the capacitor 23 is released through a path of capacitor 23→transistor 21→inductor 4→output transformer 16→capacitor 23.

When the transistor 21a is turned on, the charge of the transistor 23a is released through a path of capacitor 23a→output transformer 16→inductor 4→transistor 21a→capacitor 23a.

In this manner, an alternating current is supplied to the primary winding part of the output transformer 16 and, on the secondary side, a voltage matching the voltage of the commercial power source 5 is generated.

In this case, the rate of saturation of the transistors 12, 12a and that of the saturable core 7 in the voltage controlled oscillator 3 depend on the voltage of the solar cell 1. In other words, the saturation rates increase with the increasing magnitude of the voltage of the solar cell 1. Thus, the Royer's oscillator satisfactorily fulfils its function as the voltage controlled oscillator 3. The same operation and effect as described with reference to FIG. 1 can be attained by the circuit of FIG. 3.

Figure 4:
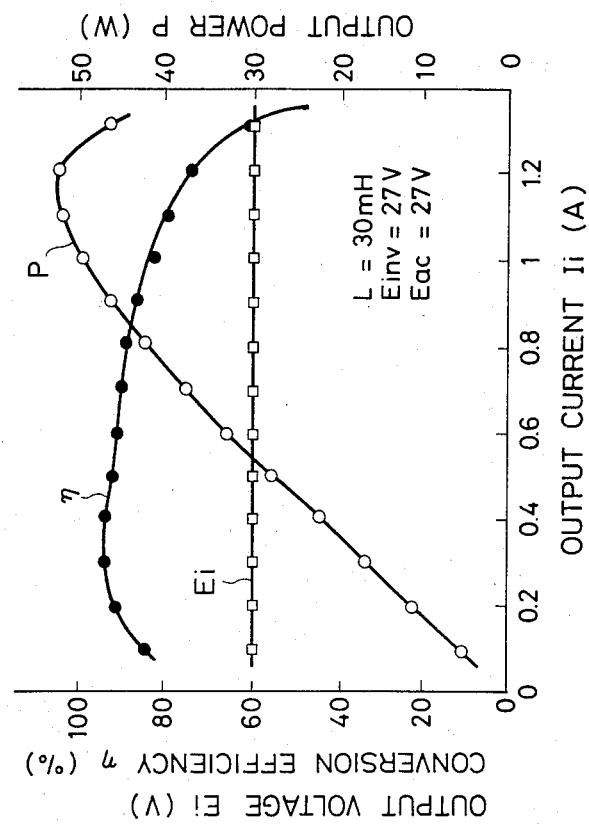
FIG. 4 is a graph showing the variations of the output voltage (Ei), output power (P) and the convertion efficiency ($\eta$) caused by varying the internal resistance of the solar cell and consequently the output electric current (Ii).

FIG. 4 is a graph of the data obtained in an operation of the embodiment of FIG. 3, except that a power source unit formed by series connection of a battery of 64 V and a variable resistor as internal resistance to serve as a model simulating the solar cell 1. Specifically, the graph shows the variations of output voltage (Ei), output power (P), and conversion efficiency ($\eta$) as caused by varying the internal resistance and consequently the output current Ii in the model. In the experiment, the inductance of the inductor 4 is fixed at 30 mH and the voltage of the commercial power source 5 and the output ac voltage of the inverter 2 are fixed at 27 V.

From this graph, it will be noted that the terminal voltage is retained substantially constant at 60 V and the conversion efficiency is as high as about 90%.

Figure 5:
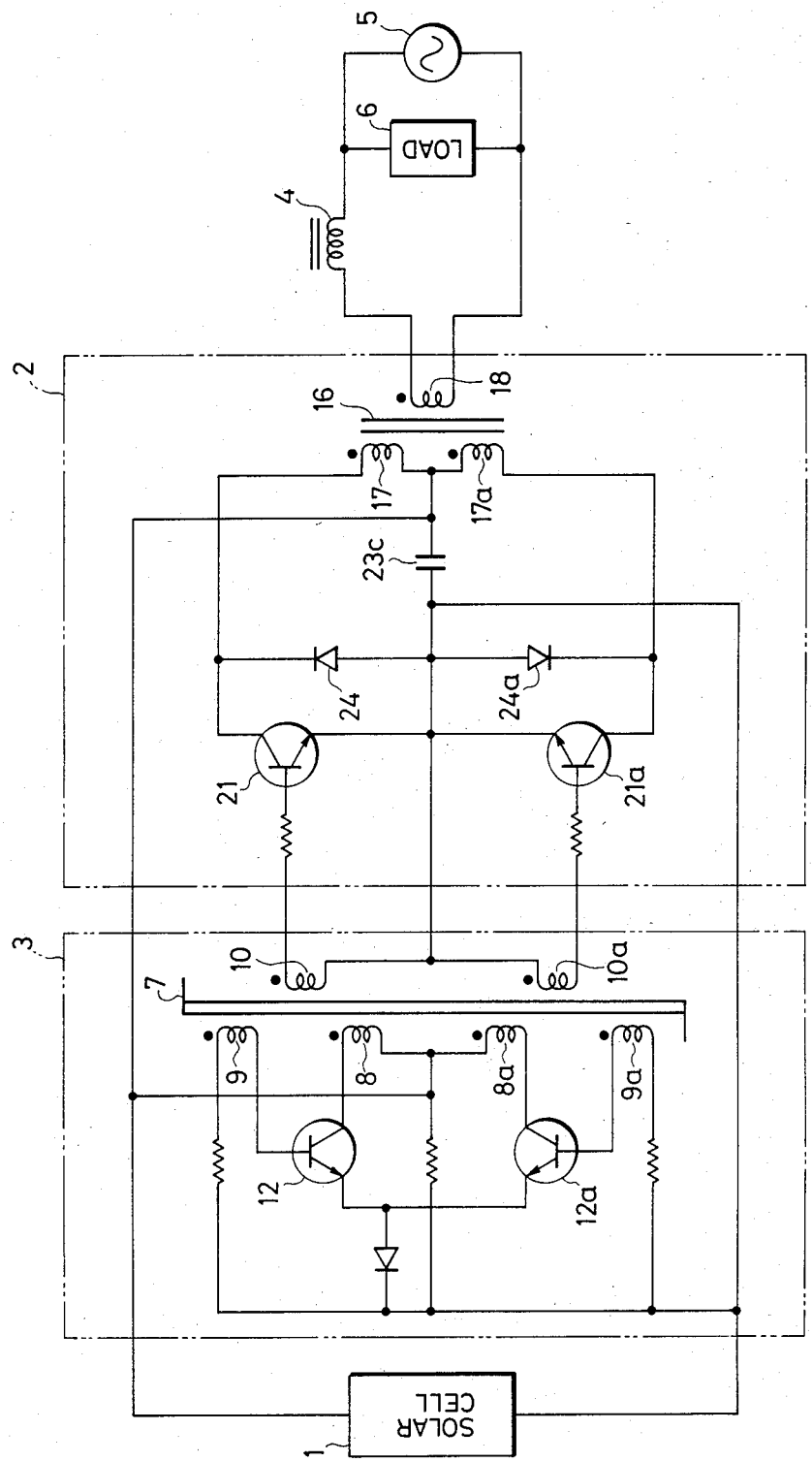
FIG. 5 and FIG. 6 are typical circuit diagrams of other embodiments of this invention.

FIG. 5 is a diagram of a typical circuit of another embodiment of this invention. In this diagram, the same numerical signs as those found in FIG. 3 denote identical or equal component parts.

The leading terminals of the output windings 10, 10a are mutually joined and the remaining terminals thereof are connected to the bases of the transistors 21, 21a. The common node of the aforementioned output windings 10, 10a is connected to the emitters of the transistors 21, 21a and to the negative terminal of the solar cell 1 and one of the terminals of the capacitor 23c.

Between the collectors and emitters respectively of the transistors 21, 21a, the diodes 24, 24a are connected in reverse polarity. The collectors of the transistors 21, 21a are connected respectively to the leading terminals of the primary windings 17, 17a of the output transformer 16.

The remaining terminals of the primary windings 17, 17a of the aforementioned output transformer 16 are mutually joined and the node is connected to the positive terminal of the solar cell 1 and the remaining terminal of the capacitor 23c. The secondary winding 18 of the output transformer 16 is connected via the inductor 4 to the commercial power source 5.

During the operation of the device, the transistors 21 and 21a are alternately turned on in much the same manner as in the embodiment of FIG. 3.

When the transistor 21 is turned on, the charge accumulated in the capacitor 23c is released through a path of capacitor 23c→primary winding 17→transistor 21→capacitor 23. When the transistor 21a is turned on, the charge accumulated in the capacitor 23c is released through a path of capacitor 23c→primary winding 17a→transistor 21a→capacitor 23.

As the result, an alternating current is generated in a secondary winding 18 and is fed via the inductor 4 to the load 6 and the commercial power source 5.

Evidently, the configuration of FIG. 5 attains the same operation and effect as those of the embodiment of FIG. 3.

Figure 6:
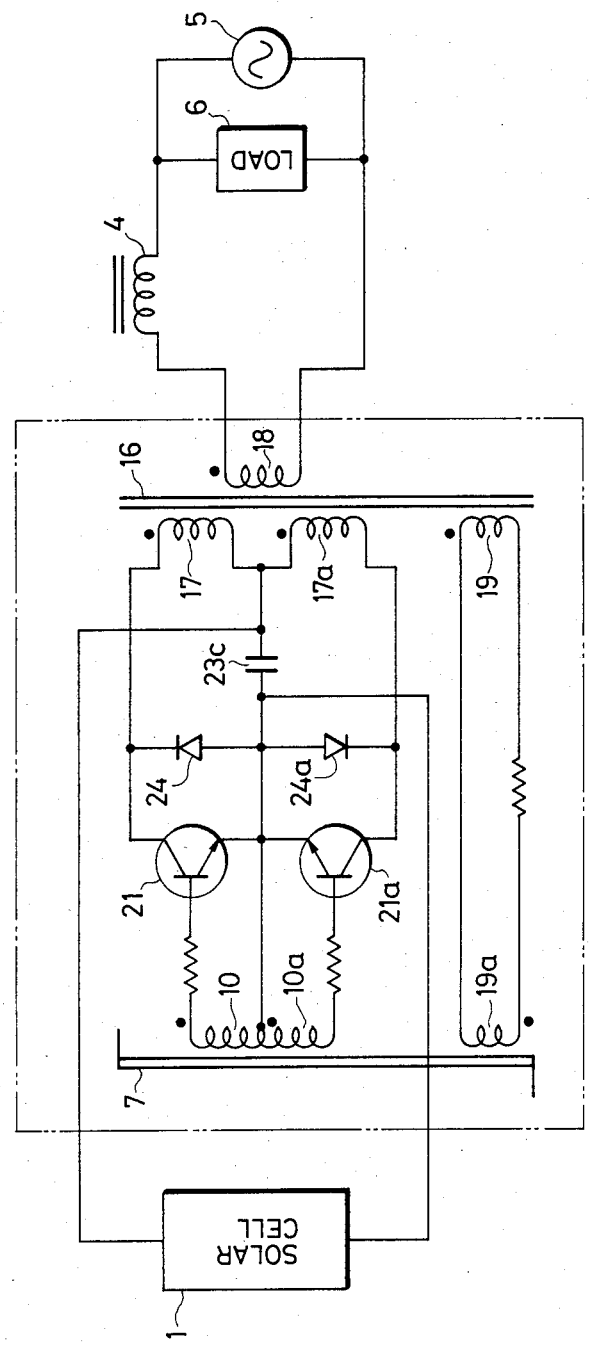

FIG. 6 is a diagram of a typical circuit of yet another embodiment of the present invention. In the diagram, the same numerical signs as those found in FIG. 5 denote identical or equal component parts.

In this embodiment, an union of the voltage controlled oscillator 3 and the inverter 2 of FIG. 1, namely a so-called Jensen type inverter is adopted.

If the transistor 21 is turned on, the current from the solar cell 1 and the discharge current by the charge accumulated in the capacitor 23c are caused to flow through the primary winding 17 and the transistor 21.

As the result, the voltage induced in the tertiary winding 19 is applied to the feedback winding 19a. The voltages induced in the output windings 10, 10a by the feedback winding 19a give a forward bias upon the transistor 21 and a reverse bias upon the transistor 21a.

Consequently, the so-called positive feedback action is generated to induce abrupt saturation of the transistor 21. In the meantime, the saturable core 7 is excited by the current flowing through the feedback winding 19a and the magnetic flux of the saturable core 7 is saturated in due course of time.

The voltage of the output winding 10 is extinguished and the base current of the transistor 21 is reduced to 0, with the result that the transistor 21 is shut off. Since the magnetic flux of the saturable core 7 consequently begins to decrease, a voltage of reverse polarity is induced in the output windings 10, 10a.

As the result, the transistor 21a assumes a forward bias and the transistor 21 a reverse bias. The transistor 21a is turned on to start flow of the current from the primary winding 17a through the transistor 21a.

Owing to the same positive feedback action as described above, the transistor 21a is saturated in this time and the saturable core 7 is excited so that the magnetic flux of the core 7 is saturated in a reverse direction.

In the manner described above, the two transistors 21 and 21a are alternately turned on, with the result that a primary current is supplied to the primary windings 17, 17a and an alternating current (rectangular waveform) is generated in the secondary winding 18. This alternating current is filtered by the inductor 4 and supplied to the commercial power source 5 and to the load 6.

Also in the embodiment of FIG. 6, the interval between the time the transistor 21 begins to be turned on and the time the saturable core 7 is saturated to shut off the transistor 21 depends on the terminal voltage of the solar cell 1. Evidently, therefore, this embodiment attains the same operation and effect as those of the embodiment of FIG. 1.

The foregoing embodiments have been invariably described on the assumption that the operating frequency of the inverter, namely the output frequency f of the voltage controlled oscillator 3, is substantially equal to the fundamental frequency of the ac output of the inverter 2 or the frequency of the commercial power source 5. Optionally, a PWM (pulse width modulation) inverter may be used as the inverter 2 of this invention.

In this case, as easily understood by persons skilled in the art, there must be incorporated means which is capable of selecting an integral multiple of the frequency of the commercial power source 5 as the output frequency f of the voltage controlled oscillator 3, using this output frequency f as a clock, and turning ON and OFF the inverter 2 on a predetermined timing.

Figure 7:
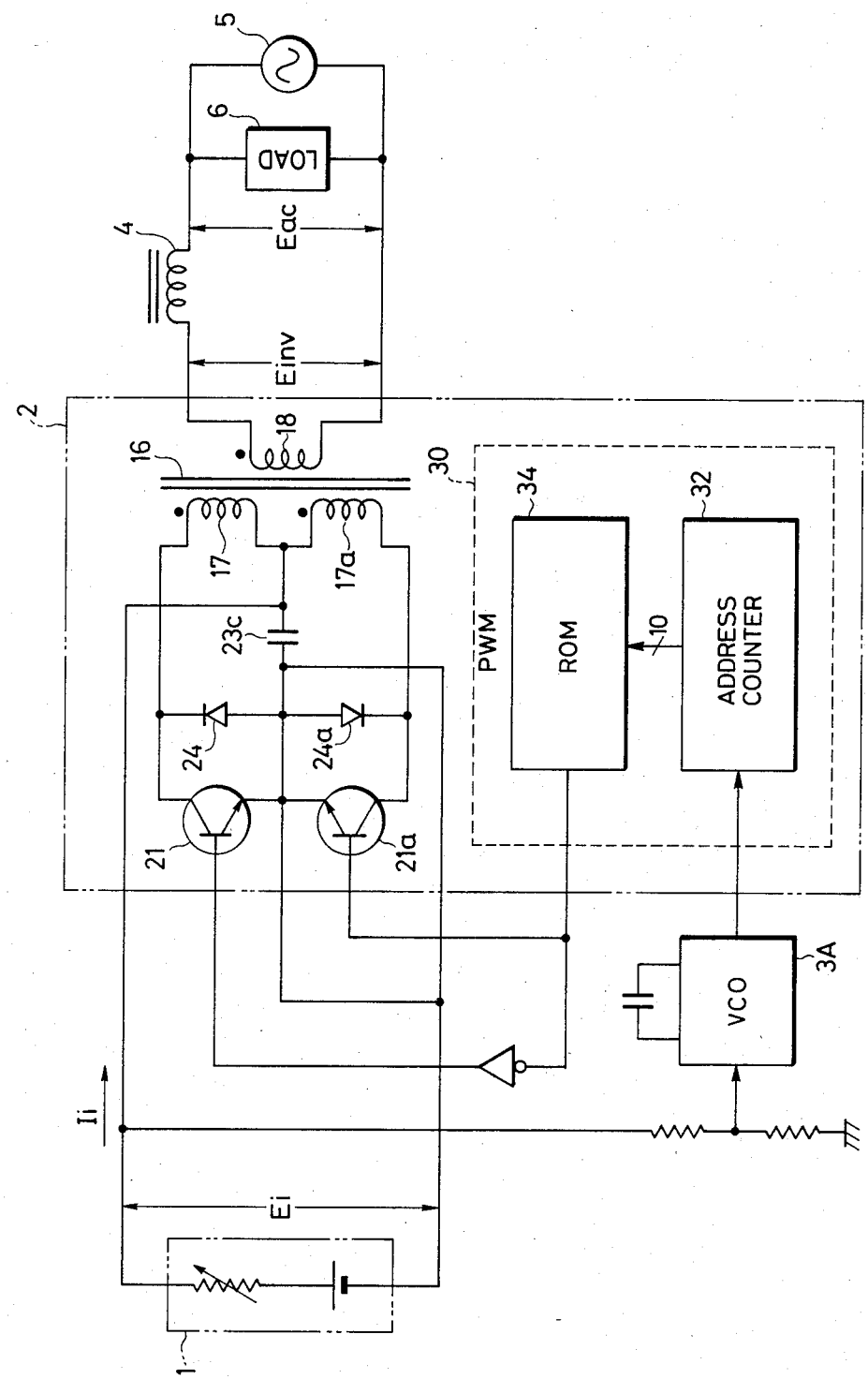
FIG. 7 is a block diagram of yet another embodiment of this invention involving the use of a PWM inverter.

FIG. 7 is a block diagram of yet another embodiment of this invention involving the use of a PWM inverter. In the diagram, the same numerical symbols as those of FIG. 5 denote identical or equal component parts.

The voltage controlled oscillator 3A generates oscillation with a frequency which is an integral multiple of the frequency of the commercial power source 5. An address counter 32 serves to take count of the output pulses of the voltage controlled oscillator 3A and gives the counted value as an address signal to a ROM (read only memory) 34. The ROM 34 issues the output of "1" or "0" corresponding to the sine wave in accordance with the aforementioned address signal. By the aforementioned output "1" or "0," one of the transistors 21, 21a is turned ON and the other transistor OFF respectively. In this configuration, the inverter output Einv to be obtained is free from higher harmonics.

So far the present invention has been described as used in the form of a power source for an ac load. Optionally, this invention can be applied to a dc load. In this case, the given dc load may, for example, be connected directly to the solar cell 1.

When the output power of the solar cell 1 surpasses the power consumed by the dc load, the excess power is transmitted to the commercial power source 5 side as described above. Conversely when the output power of the solar cell falls short of the power consumed by the load, the supplement of dc current is fed from the commercial power source 5 via the inverter 2 to the dc load because the inverter 2 functions as a rectifier (or ac-to-dc converter). Consequently, the terminal voltage of the solar cell 1 is retained substantially constant.

As is plain from the foregoing description, this invention produces the following effects.

(1) The device of this invention can draw from the solar cell the maximum power corresponding to the amount of incident sunlight reaching the solar cell.

(2) The device permits interconnection between the solar cell and the commercial power source. This interconnection proves highly advantageous in respect that it obviates the necessity for a storage battery and that, when the power from the solar cell is insufficient, the power from the commercial power source may be used to fill the shortage and, when the power from the solar cell is in excess, the surplus of power may be returned to the commercial power source with great ease, and that, therefore, the device has virtually no use for maintenance. Thus, the device proves sufficiently serviceable for household applications.

(3) The device warrants stable supply of power to ac loads and to dc loads as well.

(4) Since the device effectively operates without a storage battery, it enjoys simplicity of maintenance and promises extensive practical utility.

What is claimed is:

1. A power conversion device for a solar cell having a pair of output terminals between which a dc output voltage is produced, comprising a voltage controlled oscillator (VCO) connected to the output terminals for generating an output oscillation with a frequency which is the function of the dc output voltage of said solar cell, an inverter having a chopping frequency which is controlled based on the output frequency of said voltage controlled oscillator, the inverter connected to the output terminals in parallel with the VCO to receive a dc output current of said solar cell and convert said dc output current into an alternating current (ac) output, the output frequency of the VCO and a frequency of the ac output tending to increase in the dc output voltage so that the ac output frequency is synchronized with a frequency of a commercial power source, and an inductor to couple therethrough the ac output from said inverter to the commercial power source.

2. A power conversion device according to claim 1, wherein a fundamental frequency of the output oscillation from said voltage controlled oscillator is substantially equal to a frequency of said commercial power source.

3. A power conversion device acording to claim 1, wherein a fundamental frequency of the output oscillation from said voltage controlled oscillator is substantially equal to an integral multiple of a frequency of said commerical power source and said inverter is a pulse width modulation type inverter.

4. A power conversion device for converting DC electrical power produced by a solar cell as a result of incident light received to AC electrical power and providing the AC electrical power to a commercial AC power source with the AC electrical power having a frequency which is automatically maintained in a predetermined relationship with a frequency of the commercial AC power source, wherein a DC output voltage of the solar cell increases with increases in amounts of incident light reaching the solar cell; the power conversion device comprised of:

a voltage controlled oscillator powered by the solar cell for producing a VCO output with a VCO frequency which varies as a function of a DC output voltage of the solar cell;

an inverter connected to the solar cell in parallel with the VCO and responsive to the VCO output for converting a DC output current from the solar cell into the AC electrical power having a frequency which varies with VCO frequency so that the frequency of the AC electrical power increases with an increase in the DC output voltage; and an inductor for coupling therethrough the AC electrical power from the inverter to the commercial power source with a phase difference which varies as a function of the frequency of the AC electrical power, and wherein an amount of the AC electrical power coupled through the inductor increases with increases in the phase difference; wherein the DC output current flowing from the solar cell increases with increases in the AC electrical power coupled through the inductor; and wherein the DC output voltage of the solar cell tends to decrease with increases in the DC output current flow so that the frequency of the AC electrical power is automatically maintained at an essentially fixed level and is synchronized with the frequency of the commercial AC power source despite variations in the incident light received by the solar cell.

5. The power conversion device of claim 4 wherein the VCO frequency is substantially equal to the frequency of the commercial power source.

6. The power conversion device of claim 4 wherein the VCO frequency is substantially equal to an integral multiple of the commercial AC power source, and the inverter is a pulse width modulation type inverter.

* * * * *